(12) United States Patent
Halimi et al.

(10) Patent No.: US 11,280,655 B2
(45) Date of Patent: Mar. 22, 2022

(54) USE OF MULTIPLE FLOW METERING DEVICES IN PARALLEL TO MONITOR AND CONTROL FLUIDS THROUGH A PIPE

(71) Applicant: Flo Technologies, Inc., Culver City, CA (US)

(72) Inventors: Henry M. Halimi, Los Angeles, CA (US); Jeffrey A. Scilingo, Rancho Palos Verdes, CA (US)

(73) Assignee: Flo Technologies, Inc., Culver City, CA (US)

( * ) Notice: Subject to any disclaimer, the term of this patent is extended or adjusted under 35 U.S.C. 154(b) by 141 days.

(21) Appl. No.: 16/744,161

(22) Filed: Jan. 15, 2020

(65) Prior Publication Data

US 2020/0225070 A1    Jul. 16, 2020

Related U.S. Application Data

(60) Provisional application No. 62/793,308, filed on Jan. 16, 2019.

(51) Int. Cl.
*G01F 7/00* (2006.01)
*G01F 15/00* (2006.01)

(52) U.S. Cl.
CPC ............ *G01F 7/005* (2013.01); *G01F 15/005* (2013.01)

(58) Field of Classification Search
None
See application file for complete search history.

(56) References Cited

U.S. PATENT DOCUMENTS

| | | | | |
|---|---|---|---|---|
| 5,741,977 A | * | 4/1998 | Agar | G01F 1/74 73/861.04 |
| 5,905,200 A | * | 5/1999 | Eldridge | G01F 1/20 73/202 |
| 8,555,920 B2 | * | 10/2013 | Hirata | G05D 7/0664 137/599.07 |
| 2009/0007654 A1 | * | 1/2009 | Niikawa | G01F 1/6842 73/202 |
| 2018/0136673 A1 | | 5/2018 | Halimi | |

* cited by examiner

*Primary Examiner* — Harshad R Patel
(74) *Attorney, Agent, or Firm* — Hackler Daghighian Martino & Novak

(57) ABSTRACT

A fluid metering system includes a first and a second fluidic pipe section disposed in parallel between a fluidic pipe inlet and outlet. The first fluidic pipe section includes a first flow control device and a first flow metering device each connected in fluidic series. The second fluidic pipe section includes a second flow metering device connected in fluidic series. The fluidic pipe inlet and the fluidic pipe outlet have the same cross-sectional area and/or flow rate capacity. The first fluidic pipe section has an equal or smaller cross-sectional area and/or flow rate capacity in comparison to the fluidic pipe inlet and outlet. The second fluidic pipe section has a smaller cross-sectional area and/or flow rate capacity in comparison to the cross-sectional area and/or flow rate capacity of the first fluidic pipe section. Alternatively, the second fluidic pipe section may include a second flow control device connected in fluidic series.

19 Claims, 3 Drawing Sheets

USE OF MULTIPLE FLOW METERING DEVICES IN PARALLEL TO MONITOR AND CONTROL FLUIDS THROUGH A PIPE

CROSS-REFERENCE TO RELATED APPLICATIONS

This non-provisional application claims priority to the provisional application 62/793,308 filed Jan. 16, 2019, the entire contents of which are hereby incorporated in full by this reference.

DESCRIPTION

Field of the Invention

The present invention generally relates to monitoring the fluid flow through pipes. More particularly, the present invention relates to a structure and method of monitoring fluid flow through a pipe during low flow conditions with improved accuracy.

Background of the Invention

Low Flow Accuracy (i.e. LFA) is challenging in most industrial, commercial and municipal water metering applications especially when pipe sections are large and/or the low flow accuracy desired is relatively lower than provided by commercial flow metering apparatus. Additionally, flow metering apparatus lose low flow accuracy as pipe sections increase and the price of such apparatus for large pipe sizes with acceptable low flow accuracy drastically increase.

Current practiced art utilizes compound meter arrangements wherein lower flow is hydraulically biased through a smaller and more accurate part of the meter. While this method can improve low flow accuracy performance, this arrangement does not economically sustain desired flow accuracy across full flow ranges for large size pipes.

Accordingly, there is a need for an improvement to accommodate a cheaper and more accurate way of achieving a low flow accuracy. Furthermore, there is also a need to simultaneously achieve both low flow accuracy along with moderate to high flow accuracy in larger pipe sizes when use of compound metering is not economical or practical. The present invention fulfills these needs and provides other related advantages.

SUMMARY OF THE INVENTION

An exemplary embodiment of the present invention is a fluid metering system 100, comprising: a fluidic pipe inlet 112; a first fluidic pipe section 116 and a second fluidic pipe section 116, each having a first end 116a opposite a second end 116b; a fluidic pipe outlet 114; wherein the first ends of the first and the second fluidic pipe sections are fluidly connected to the fluidic pipe inlet; wherein the second ends of the first and second fluidic pipe sections are fluidly connected to the fluidic pipe outlet; wherein the first and second fluidic pipe sections are connected in parallel in relation one another and disposed between the fluidic pipe inlet and the fluidic pipe outlet; wherein the fluidic pipe inlet, the first fluidic pipe section, the second fluidic pipe section and the fluidic pipe outlet are configured to transport a fluid flow 118, the fluid flow configured to flow in series through the first fluidic pipe inlet and configured to be divided and flow in parallel through both the first and the second fluidic pipe sections and then combine to flow in series through the fluidic pipe outlet; wherein the first fluidic pipe section comprises a first flow control device 120 and a first flow metering device 122 each connected in fluidic series along the first fluidic pipe section between its first and second ends; wherein the second fluidic pipe section comprises a second flow metering device 122 connected in fluidic series along the second fluidic pipe section between its first and second ends; wherein the fluidic pipe inlet and the fluidic pipe outlet have the same cross-sectional area and/or flow rate capacity; wherein the first fluidic pipe section has an equal or smaller cross-sectional area and/or flow rate capacity in comparison to the fluidic pipe inlet and outlet; and wherein the second fluidic pipe section has a smaller cross-sectional area and/or flow rate capacity in comparison to the cross-sectional area and/or flow rate capacity of the first fluidic pipe section.

In other exemplary embodiments, the second fluidic pipe section may comprise a second flow control device 120 connected in fluidic series along the second fluidic pipe section between its first and second ends.

Each flow control device 120 may comprise a fluid valve and an electric motor mechanically connected to the fluid valve, which is best understood when referring to U.S. Publication 2018/0136673, the contents of which are fully incorporated herein in its entirety. (For example, in the '673 Publication the fluid valve is numeral 22 and the electric motor is numeral 2. Therefore, the numeral convention used in the '673 Publication has been retained herein for consistency.) The flow control device is in fluidic series along its respective fluidic pipe section, the fluid control device controlling the fluidic flow through its respective fluidic pipe section.

The flow metering device is configured to measure the fluid flow within its respective fluidic pipe section.

Each flow control device may comprise a specialized check valve, a directly-actuated ball valve, a gate valve, a globe valve, a remotely controlled valve, a solenoid valve or an automatic pilot-type control valve.

The fluid metering system may include a third fluidic pipe section having a first end opposite a second end, wherein the first end of the third fluidic pipe sections is fluidly connected to the fluidic pipe inlet and wherein the second end of the third fluidic pipe section is fluidly connected to the fluidic pipe outlet, wherein the first, second and third fluidic pipe sections are connected in parallel in relation one another and disposed between the fluidic pipe inlet and the fluidic pipe outlet, wherein the fluidic pipe inlet, the first fluidic pipe section, the second fluidic pipe section, the third fluidic pipe section and the fluidic pipe outlet are configured to transport the fluid flow, the fluid flow configured to flow in series through the first fluidic pipe inlet and configured to be divided and flow in parallel through both the first, the second and the third fluidic pipe sections and then combine to flow in series through the fluidic pipe outlet. The third fluidic pipe section may comprise a third flow control device and a third flow metering device each connected in fluidic series along the third fluidic pipe section between its first and second ends. The third fluidic pipe section may have a smaller cross-sectional area and/or flow rate capacity in comparison to the cross-sectional area and/or flow rate capacity of the second fluidic pipe section.

The fluid metering system may include a fourth fluidic pipe section having a first end opposite a second end, wherein the first end of the fourth fluidic pipe sections is fluidly connected to the fluidic pipe inlet and wherein the second end of the fourth fluidic pipe section is fluidly connected to the fluidic pipe outlet, wherein the first, second, third and fourth fluidic pipe sections are connected in parallel in relation one another and disposed between the fluidic pipe inlet and the fluidic pipe outlet, wherein the fluidic pipe inlet, the first fluidic pipe section, the second fluidic pipe section, the third fluidic pipe section, the fourth fluidic pipe section and the fluidic pipe outlet are configured to transport the fluid flow, the fluid flow configured to flow in series through the first fluidic pipe inlet and configured to be divided and flow in parallel through both the first, the second, the third and the fourth fluidic pipe sections and then combine to flow in series through the fluidic pipe outlet. The fourth fluidic pipe section may comprise a fourth flow control device and a fourth flow metering device each connected in fluidic series along the fourth fluidic pipe section between its first and second ends. The fourth fluidic pipe section may have a smaller cross-sectional area and/or flow rate capacity in comparison to the cross-sectional area and/or flow rate capacity of the third fluidic pipe section.

The flow control devices and the flow metering devices may be in electrical communication with an electronic controller 124 (41), the electronic controller configured to receive an electronic signal (i.e. flow rate information and/or pressure information which can be converted into an actual flow rate from a differential pressure transducer or the like) from the flow metering devices and to control an opening and closing of the flow control devices. The electronic controller 124(41) may be a microprocessor or a cloud command center/hub 43,50 that is hard wired or wirelessly connected to the Internet 59. All of the controls and interface technology disclosed in U.S. publication 2018/0136673 is applicable to the present invention, therefore it is not repeated herein but is incorporated in its entirety.

Alternatively, each flow control device may comprise a check valve. In this embodiment, the check valves may not be in electrical communication with the electronic controller 124 (41).

Each flow metering device may be configured to operate accurately within a different flow rate range.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
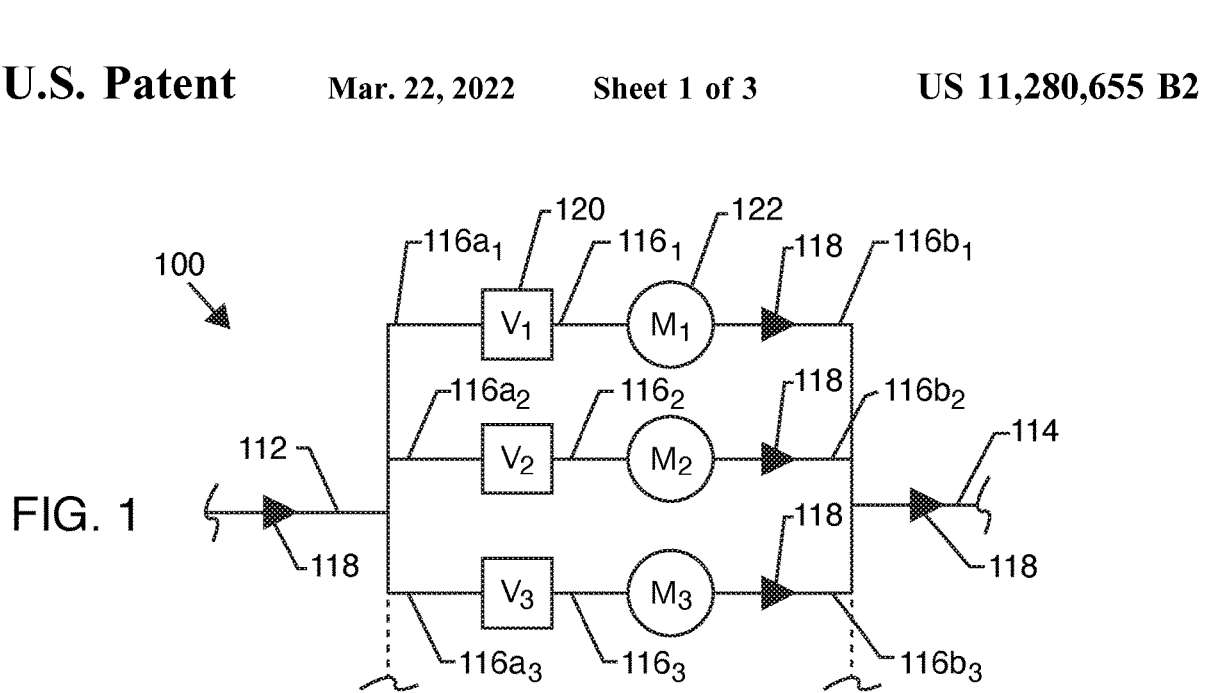
FIG. 1 is a fluidic schematic of one embodiment of a flow metering device of the present invention.
Figure 2:
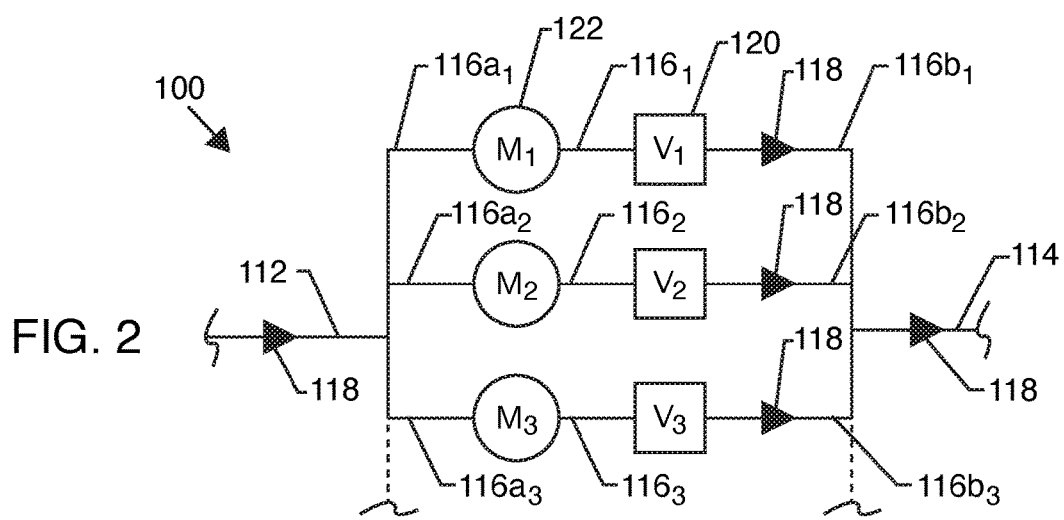
FIG. 2 is a fluidic schematic of another embodiment of a flow metering device of the present invention.

The present invention teaches a solution to such problems described earlier by creating an integrated system with multiple Flow Metering/Sensing Devices (i.e. FMD/FSD) disposed in parallel, each Flow Metering Device configured to operate accurately within a different flow rate range such that a variety of flow rates can all be measured accurately. (It is noted that a Flow Metering Device "FMD" and Flow Sensing Device "FSD" refer to equivalent structures and were used interchangeably in the '308 provisional application. For consistency this application will use FMD.) On the inlet or outlet side of each FMD one or more valves may be installed to characterize the flow through each FMD. These valves, where installed, are herein referred to as Flow Control Devices (i.e. FCD).

A flow meter/sensor is a device used to measure the volume or mass of a gas or liquid. Flow meters are referred to by many names, including flow gauge, flow indicator, liquid meter, flow rate sensor, etc. depending on the particular industry. However, they all measure flow of the liquid and/or gas that is moving through the pipe.

As taught herein, it will also be understood that multiple parallel FMDs can be nested with in a parallel system, such as 2, 3, 4, 5 or any "n" number of parallel FMDs systems. Alternatively, within a single pipe section two or more FMDs can be utilized. These two or more FMDs can be the exact same device for redundancy, or can be differently sized to measure different flow rates accurately.

The FCD can be an individual valve or combination of different types of valves such as a specialized check valve, a directly-actuated ball valve, a gate valve, a globe valve, a remotely controlled valve, a solenoid valve or an automatic pilot-type control valve. These valves can be placed in series or parallel with each other within the FCD. Furthermore, the FMD and the valve could be in the same embodiment such as the device taught in U.S. publication 2018/0136673, the contents of which are fully incorporated herein in its entirety. Alternatively, the FCD could be a simple check valve which means that there would be no need for electrical actuations when only a simple check valve is used.

FCDs are configured to be responsive to a flow reading or a pressure signal (mechanical or electrical). FCDs can modulate flow to characterize flow within a system to achieve optimum metering flow rates through each FMD. FCDs can be controlled locally via a controller (microprocessor) or the FCDs can be controlled remotely via a cloud command center over the Internet or within a local intranet system.

As taught herein, it will also be understood that multiple parallel FCDs can be nested with in a parallel system, such as 2, 3, 4, 5 or any "n" number of parallel FCDs. Alternatively, within a single pipe section two or more FCDs can be utilized. These two or more FCDs can be the exact same of valve device for redundancy, or can be different valve types which may control flow accurately for different flow rates.

Depending on the pipe size and required degree of LFA, control, automation, etc. the combinations of FMD and FCD can vary as is shown in FIGS. 1-5.

Each FMD can provide direct flow registration information via dial and/or digital display, record the flow through the device within the device for local reading and/or report the flow electronically through wired or wireless means. Electronic flow readings can be scanned in variety of scan rates and are reported in real time or at desired intervals.

Electronic signals from the FMD(s) (if present) and the control signals to FCD(s) (if applicable) can be processed locally and/or transmitted to the cloud via wireless communications protocol. Data can be processed and analyzed to monitor total flow through the system.

Algorithms can be configured to control the state of FCD(s) which controls flow through various parallel branches to achieve the desired LFA.

FIGS. 1-5 shows some typical configurations that are possible with the present invention. (The flow direction through the pipes is represented by the arrow 118, but it understood that the flow direction may be reversed for any of the embodiments taught herein.) There are many other possible combinations depending of the desired results as is understood by those skilled in the art in light of this teaching. FIG. 1 shows three pipe sections 116 but it could be 2, 3, 4, 5 or any "n" number of pipe sections as shown by the dashed lines. FIG. 1 has the FCD 120 shown as a box with a "V" for valve, which can be any of the valve types previously discussed. After the FCD 120 is the FMD 122 which is shown as a circle with an "M" for meter. In this embodiment the meter is down stream of the valve. Whereas, in FIG. 2 the opposite occurs where the FMD 122 is upstream of the FCD 120.

Figure 3:
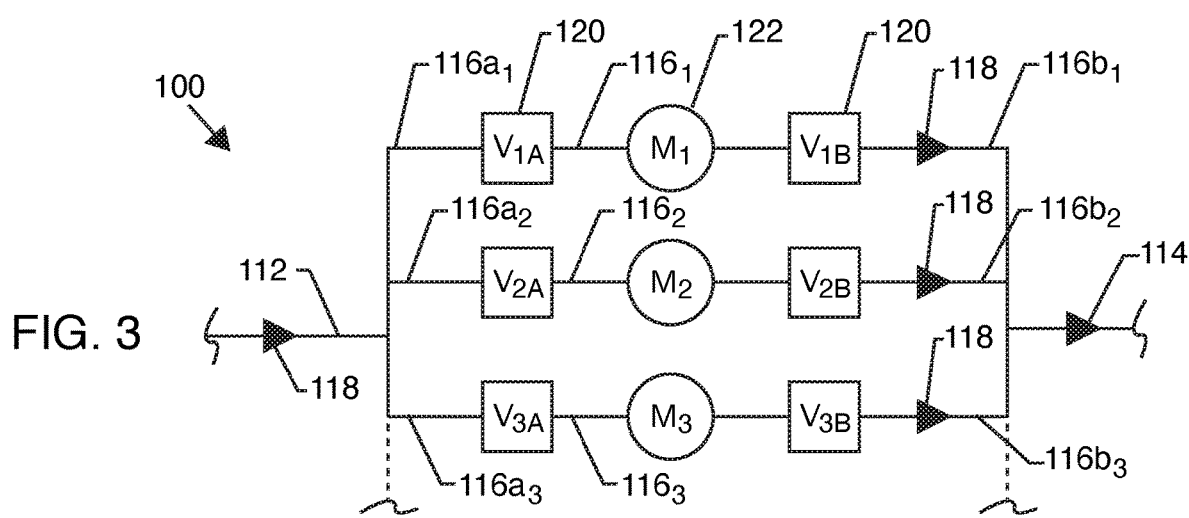
FIG. 3 is a fluidic schematic of another embodiment of a flow metering device of the present invention.

FIG. 3 shows another embodiment where there are now two (or more) FCDs ($V_A$ and $V_B$) being disposed on opposite sides of the FMD 122. As an alternative not shown, two or more FMDs could be disposed within each parallel pipe portion.

Figure 4:
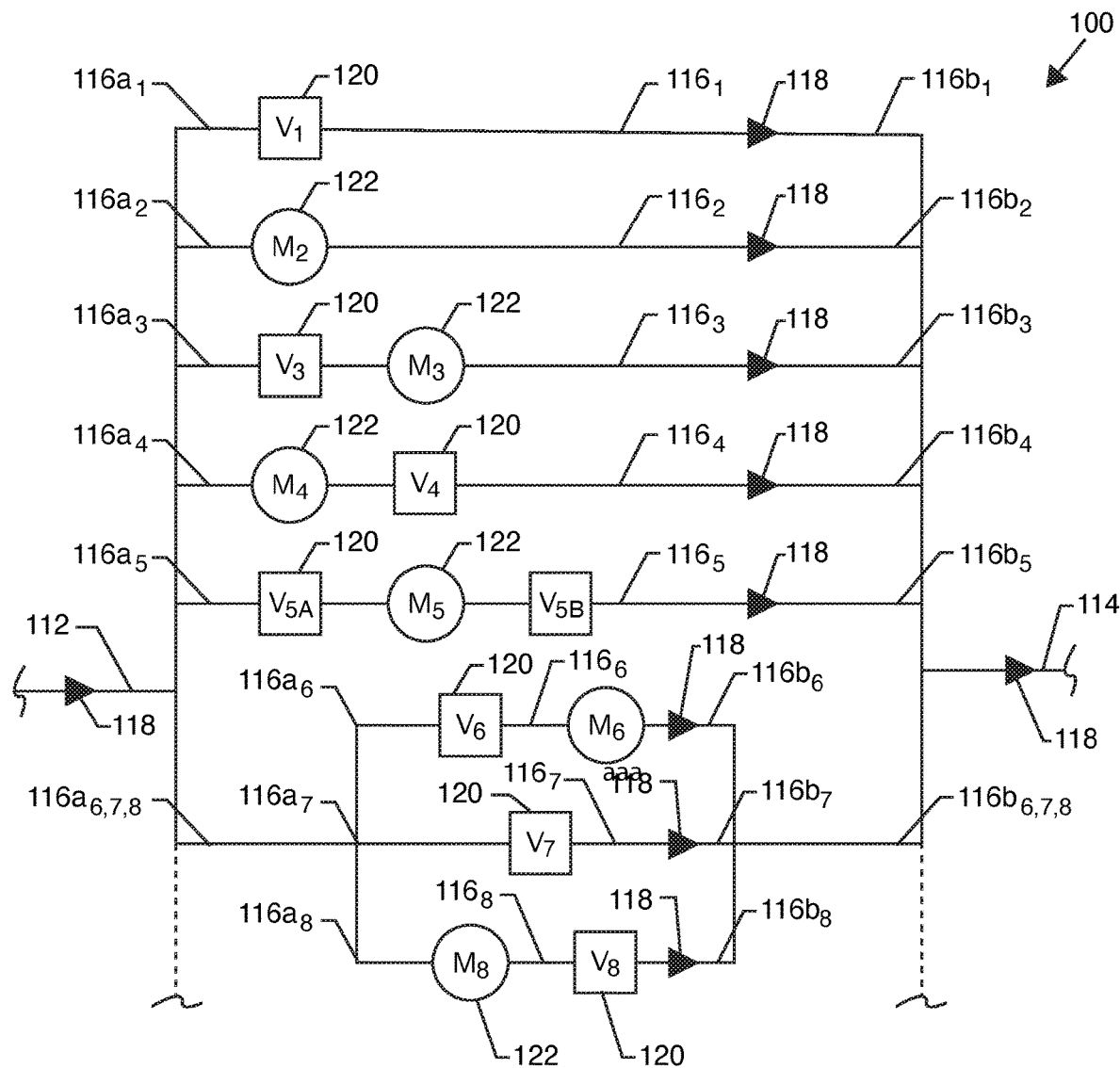
FIG. 4 is a fluidic schematic of another embodiment of a flow metering device of the present invention.

FIG. 4 shows another embodiment where there are multiple configurations and piping schemes all contained within one embodiment. FIG. 4 shows the complexity that is possible with the present invention. It is understood by those skilled in the art that any portion of this embodiment may be utilized, or combinations thereof be created from this embodiment.

There are many applications that this art can be used for. The following are some further examples of these applications.

Example 1

Figure 5:
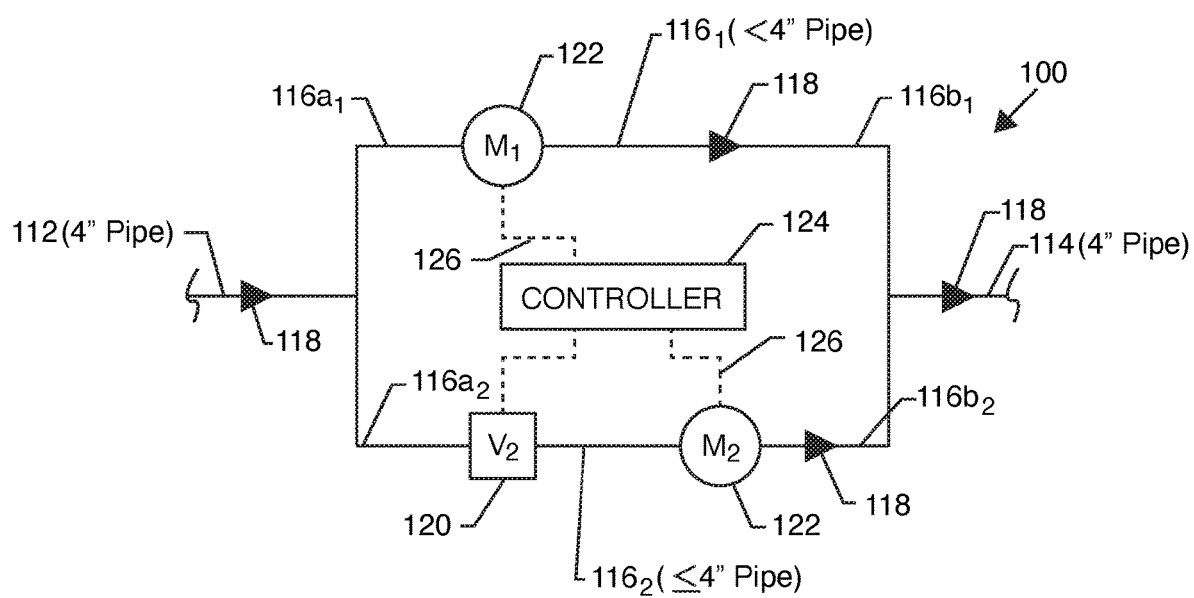
FIG. 5 is a fluidic schematic of another embodiment of a flow metering device of the present invention.

Referring now to FIG. 5, on a 4" pipe diameter installation a contractor desires to meter the flow through the pipe with the LFA that is not offered in the commercially available 4" flow metering devices or the cost for such a flow meter is not commercially viable. The inlet 112 and outlet 118 are 4" diameter pipes. The upper parallel pipe portion is a size smaller (i.e. <4" pipe) than the 4" diameter inlet and outlet pipes. The lower parallel pipe portion can also be smaller or equal (i.e. ≤4") to the 4" diameter inlet and outlet. FIG. 5 shows a solution where FMD 122 (M1) is connected in series to a much smaller pipe section than four inches (4") but offers the desired LFA. FMD 122 (M2) is a commercially available device that does not offer the required LFA. FCD 120 (V2) is an electrically actuated valve. In this example all connections are shown as "hard wired" 126, although it is understood that the same installation could be wireless with local communication capability or Wi-Fi (cloud) connectivity. Normally FCD 120 (V2) is closed. When flow is initiated, water runs through FMD (M1). The controller/microprocessor 124 monitors the flow through FMD (M1) and as soon as it comes within the LFA of FMD (M2), and/or exceeds the accuracy range of FMD (M1), it (fully or partially) opens FCD (V2) and may close FCD (V1) which is not shown in FIG. 5, assuming that FCD (V1) was placed along the upper pipe section 116. The type and algorithm that controls FMD (V2) depends on the application. Then, the aggregate flow through the 4" pipe is the flow detected by one or both FMD (M1) and FMD (M2) and totaled together for an overall flow rate. The controller/microprocessor 124 controls the state of the FCD (V2) depending on a variety of factors, including the type of the valve, accuracy range of FMDs, the head loss through the FMDs, the maximum allowable flow through FMDs and the pressure drop through the system (if available) to name a few.

Example 2

Referring to Example 1, FCD ($V_2$) can be changed to a specialized, cascading check valve (quick-opening design). In this case microprocessor only monitors the flow as the check valve has no electrical control.

Example 3

Referring to Example 1, FMD ($M_1$) and FMD ($M_2$) can be changed to manual water meters and FCD ($V_2$) can be changed to a specialized, cascading check valve. In this example, there will no microprocessor and the aggregate flow is the sum of the readings from the two flow meters $M_1$ and $M_2$.

Example 4

Referring to FIGS. 1-5, in an application that the flow through a large pipe has been diverted through multiple similar (smaller section) FMDs, the valves in the system can be sequenced to modulate flow distribution to each FMD to work within optimum accuracy ranges of each FMD.

Example 5

Referring to FIGS. 1-5, in an application that the flow through a large pipe has been diverted through multiple similar (smaller section) FMDs, the valves in the system can be sequenced to change the primary FMD to create even wear on all devices.

Example 6

Referring to Example 1, by addition of a FCD before or after FMD ($M_1$), flow can be completely restricted. This can be used as a total flow shut-off.

In all of the embodiments disclosed herein, there are at least two parallel pipes connected to the inlet and outlet. This application teaches how the various cross-sectional areas of each pipe are sized in relation to one another. However, one skilled in the art could use the exact same size (i.e. diameter) of pipe for the inlet, outlet and for the parallel pipe portions while then installing smaller sized flow meters and devices such that it would operate in the exact same manner as taught herein. Therefore, the claims also include a reference to the various flow rate capacities of each pipe portion. A large pipe with a smaller valve will still be limited in flow capacity by the smaller valve. For example, a 4" diameter pipe will have a higher flow capacity in comparison to a similar 4" diameter pipe having a 2" ball valve disposed in series even if that 2" ball valve is fully opened. Accordingly, the claims are to be interpreted broadly to also refer to the relative flow rate capacities of each pipe section in total such that large pipes with smaller meters and/or valves do not escape the coverage of the claims by unscrupulous infringers.

In another alternative not shown, FIG. 5 could be modified (just as the other embodiments could be modified) such that both parallel lines were smaller in cross sectional area and/or flow rate capacity in comparison to the inlet and outlet, but were also of the same size with respect to one another. For example, the inlet and outlet pipes could be 4"

in diameter while the two parallel lines could be 2" inches in diameter. Furthermore, each parallel line could have a FMD 122 that registered accurately for a different flow rate in comparison to other parallel line. In other words, $M_1$ and $M_2$ could have different flow ranges that they were accurate for measuring.

One further benefit of the present invention is that it maintains the primary pipeline capacity (i.e. the inlet and outlet capacity) as compared to other methods that are restrictive and have a redacted capacity.

Although several embodiments have been described in detail for purposes of illustration, various modifications may be made to each without departing from the scope and spirit of the invention. Furthermore, combinations of the variations taught herein are also possible. Accordingly, the invention is not to be limited, except as by the appended claims.

What is claimed is:

1. A fluid metering system, comprising:
a fluidic pipe inlet;
a first fluidic pipe section and a second fluidic pipe section, each having a first end opposite a second end;
a fluidic pipe outlet;
wherein the first ends of the first and the second fluidic pipe sections are fluidly connected to the fluidic pipe inlet;
wherein the second ends of the first and second fluidic pipe sections are fluidly connected to the fluidic pipe outlet;
wherein the first and second fluidic pipe sections are connected in parallel in relation to one another and disposed between the fluidic pipe inlet and the fluidic pipe outlet;
wherein the fluidic pipe inlet, the first fluidic pipe section, the second fluidic pipe section and the fluidic pipe outlet are configured to transport a fluid flow, the fluid flow configured to flow in series through the first fluidic pipe inlet and configured to be divided and flow in parallel through both the first and the second fluidic pipe sections and then combine to flow in series through the fluidic pipe outlet;
wherein the first fluidic pipe section comprises a first flow control device and a first flow metering device each connected in fluidic series along the first fluidic pipe section between its first and second ends;
wherein the second fluidic pipe section comprises a second flow metering device connected in fluidic series along the second fluidic pipe section between its first and second ends;
wherein the fluidic pipe inlet and the fluidic pipe outlet have the same cross-sectional area and/or flow rate capacity;
wherein the first fluidic pipe section has an equal or smaller cross-sectional area and/or flow rate capacity in comparison to the fluidic pipe inlet and outlet; and
wherein the second fluidic pipe section has a smaller cross-sectional area and/or flow rate capacity in comparison to the cross-sectional area and/or flow rate capacity of the first fluidic pipe section;
thereby allowing the first flow control device to shut and direct the fluid flow to the second fluidic pipe section for the second flow metering device in a low flow condition for a low flow accuracy.

2. The fluid metering system of claim 1, wherein the second fluidic pipe section comprises a second flow control device connected in fluidic series along the second fluidic pipe section between its first and second ends.

3. The fluid metering system of claim 2, wherein each flow control device comprises a fluid valve and an electric motor mechanically connected to the fluid valve, wherein the fluid valve is in fluidic series along its respective fluidic pipe section, the fluid valve controlling the fluidic flow through its respective fluidic pipe section.

4. The fluid metering system of claim 2, wherein the flow metering device is configured to measure the fluid flow within its respective fluidic pipe section.

5. The fluid metering system of claim 2, wherein each flow control device comprises a specialized check valve, a directly-actuated ball valve, a gate valve, a globe valve, a remotely controlled valve, a solenoid valve or an automatic pilot-type control valve.

6. The fluid metering system of claim 2, including a third fluidic pipe section having a first end opposite a second end, wherein the first end of the third fluidic pipe sections is fluidly connected to the fluidic pipe inlet and wherein the second end of the third fluidic pipe section is fluidly connected to the fluidic pipe outlet, wherein the first, second and third fluidic pipe sections are connected in parallel in relation to one another and disposed between the fluidic pipe inlet and the fluidic pipe outlet, wherein the fluidic pipe inlet, the first fluidic pipe section, the second fluidic pipe section, the third fluidic pipe section and the fluidic pipe outlet are configured to transport the fluid flow, the fluid flow configured to flow in series through the first fluidic pipe inlet and configured to be divided and flow in parallel through the first, the second and the third fluidic pipe sections and then combine to flow in series through the fluidic pipe outlet.

7. The fluid metering system of claim 6, wherein the third fluidic pipe section comprises a third flow control device and a third flow metering device each connected in fluidic series along the third fluidic pipe section between its first and second ends.

8. The fluid metering system of claim 7, wherein the third fluidic pipe section has a smaller cross-sectional area and/or flow rate capacity in comparison to the cross-sectional area and/or flow rate capacity of the second fluidic pipe section.

9. The fluid metering system of claim 8, including a fourth fluidic pipe section having a first end opposite a second end, wherein the first end of the fourth fluidic pipe sections is fluidly connected to the fluidic pipe inlet and wherein the second end of the fourth fluidic pipe section is fluidly connected to the fluidic pipe outlet, wherein the first, second, third and fourth fluidic pipe sections are connected in parallel in relation to one another and disposed between the fluidic pipe inlet and the fluidic pipe outlet, wherein the fluidic pipe inlet, the first fluidic pipe section, the second fluidic pipe section, the third fluidic pipe section, the fourth fluidic pipe section and the fluidic pipe outlet are configured to transport the fluid flow, the fluid flow configured to flow in series through the first fluidic pipe inlet and configured to be divided and flow in parallel through the first, the second, the third and the fourth fluidic pipe sections and then combine to flow in series through the fluidic pipe outlet.

10. The fluid metering system of claim 9, wherein the fourth fluidic pipe section comprises a fourth flow control device and a fourth flow metering device each connected in fluidic series along the fourth fluidic pipe section between its first and second ends.

11. The fluid metering system of claim 10, wherein the fourth fluidic pipe section has a smaller cross-sectional area and/or flow rate capacity in comparison to the cross-sectional area and/or flow rate capacity of the third fluidic pipe section.

12. The fluid metering system of claim 2, wherein the flow control devices and the flow metering devices are in electrical communication with an electronic controller, the electronic controller configured to receive an electronic signal from the flow metering devices and to control an opening and closing of the flow control devices.

13. The fluid metering system of claim 12, wherein the electronic controller is a microprocessor or a cloud command center.

14. The fluid metering system of claim 2, wherein each flow control device comprises a check valve.

15. The fluid metering system of claim 2, wherein each flow metering device is configured to operate accurately within a different flow rate range.

16. A fluid metering system, comprising:
   a fluidic pipe inlet;
   a first fluidic pipe section and a second fluidic pipe section, each having a first end opposite a second end;
   a fluidic pipe outlet;
   wherein the first ends of the first and the second fluidic pipe sections are fluidly connected to the fluidic pipe inlet;
   wherein the second ends of the first and second fluidic pipe sections are fluidly connected to the fluidic pipe outlet;
   wherein the first and second fluidic pipe sections are connected in parallel in relation to one another and disposed between the fluidic pipe inlet and the fluidic pipe outlet;
   wherein the fluidic pipe inlet, the first fluidic pipe section, the second fluidic pipe section and the fluidic pipe outlet are configured to transport a fluid flow, the fluid flow configured to flow in series through the first fluidic pipe inlet and configured to be divided and flow in parallel through the first and the second fluidic pipe sections and then combine to flow in series through the fluidic pipe outlet;
   wherein the first fluidic pipe section comprises a first flow control device and a first flow metering device each connected in fluidic series along the first fluidic pipe section between its first and second ends;
   wherein the second fluidic pipe section comprises a second flow metering device connected in fluidic series along the second fluidic pipe section between its first and second ends;
   wherein the first fluidic pipe section has an equal or smaller cross-sectional area in comparison to the fluidic pipe inlet and outlet; and
   wherein the second fluidic pipe section has a smaller cross-sectional area in comparison to the cross-sectional area of the first fluidic pipe section;
   thereby allowing the first flow control device to shut and direct the fluid flow to the second fluidic pipe section for the second flow metering device in a low flow condition for a low flow accuracy.

17. The fluid metering system of claim 16, wherein the second fluidic pipe section comprises a second flow control device connected in fluidic series along the second fluidic pipe section between its first and second ends.

18. A fluid metering system, comprising:
   a fluidic pipe inlet;
   a first fluidic pipe section and a second fluidic pipe section, each having a first end opposite a second end;
   a fluidic pipe outlet;
   wherein the first ends of the first and the second fluidic pipe sections are fluidly connected to the fluidic pipe inlet;
   wherein the second ends of the first and second fluidic pipe sections are fluidly connected to the fluidic pipe outlet;
   wherein the first and second fluidic pipe sections are connected in parallel in relation to one another and disposed between the fluidic pipe inlet and the fluidic pipe outlet;
   wherein the fluidic pipe inlet, the first fluidic pipe section, the second fluidic pipe section and the fluidic pipe outlet are configured to transport a fluid flow, the fluid flow configured to flow in series through the first fluidic pipe inlet and configured to be divided and flow in parallel through the first and the second fluidic pipe sections and then combine to flow in series through the fluidic pipe outlet;
   wherein the first fluidic pipe section comprises a first flow control device and a first flow metering device each connected in fluidic series along the first fluidic pipe section between its first and second ends;
   wherein the second fluidic pipe section comprises a second flow metering device connected in fluidic series along the second fluidic pipe section between its first and second ends;
   wherein the first fluidic pipe section has an equal or smaller flow rate capacity in comparison to the fluidic pipe inlet and outlet; and
   wherein the second fluidic pipe section has a smaller flow rate capacity in comparison to the flow rate capacity of the first fluidic pipe section;
   thereby allowing the first flow control device to shut and direct the fluid flow to the second fluidic pipe section for the second flow metering device in a low flow condition for a low flow accuracy.

19. The fluid metering system of claim 18, wherein the second fluidic pipe section comprises a second flow control device connected in fluidic series along the second fluidic pipe section between its first and second ends.

* * * * *